Sept. 29, 1931. G. W. JACQUES 1,824,957
DUPLEX FASTENER SETTING MACHINE
Filed Feb. 5, 1927 7 Sheets-Sheet 1
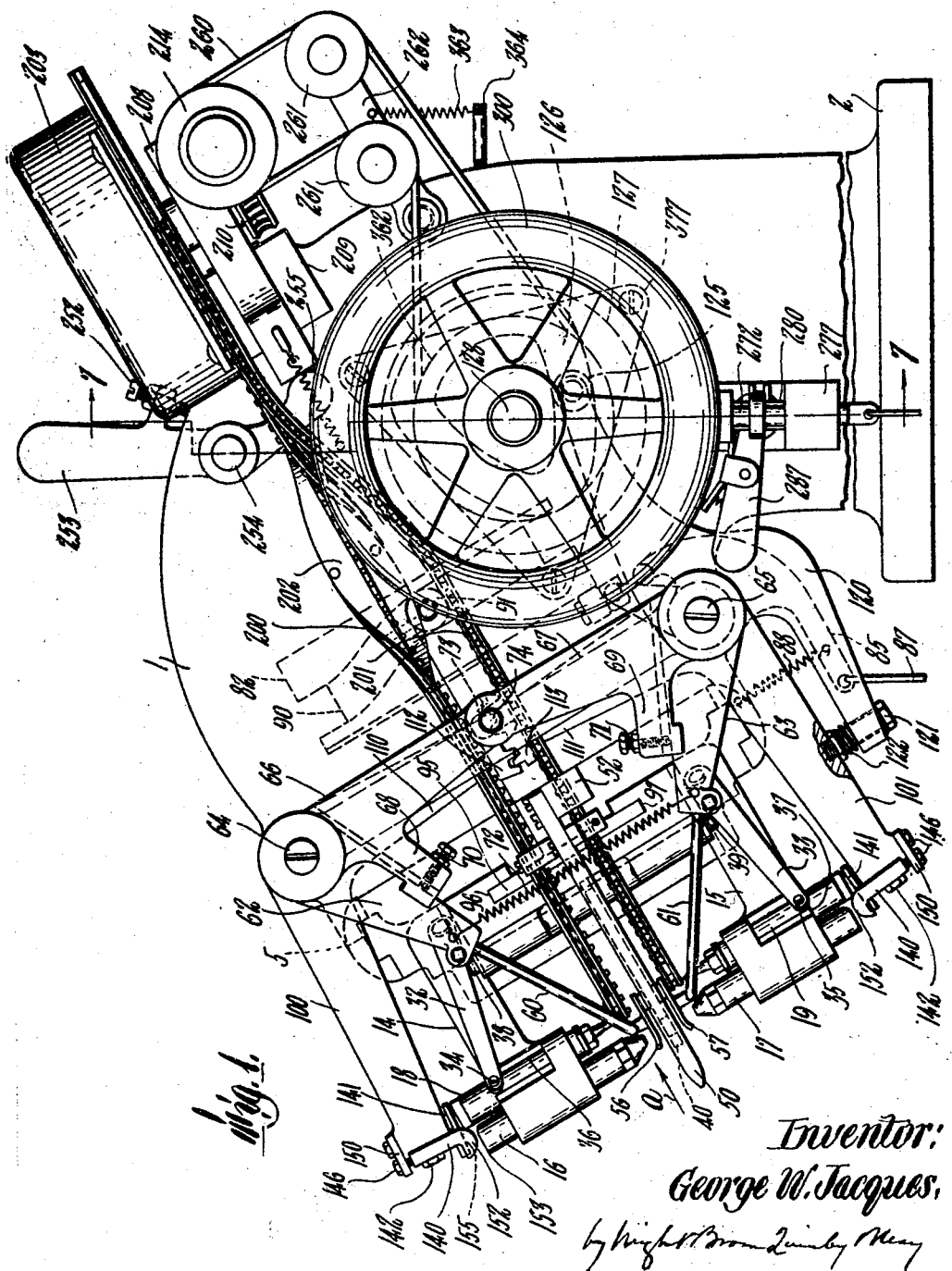

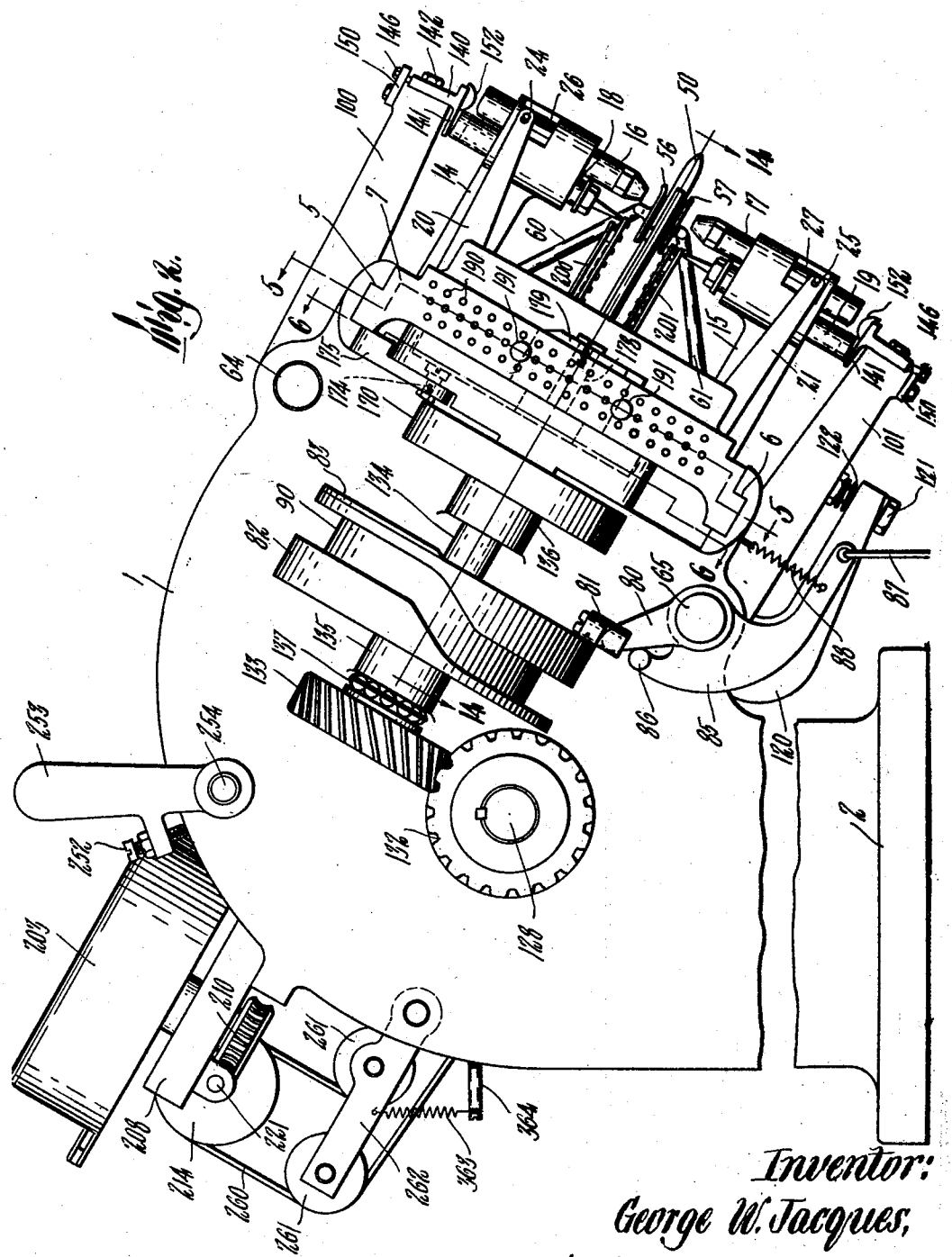

Sept. 29, 1931. G. W. JACQUES 1,824,957
DUPLEX FASTENER SETTING MACHINE
Filed Feb. 5, 1927 7 Sheets-Sheet 3
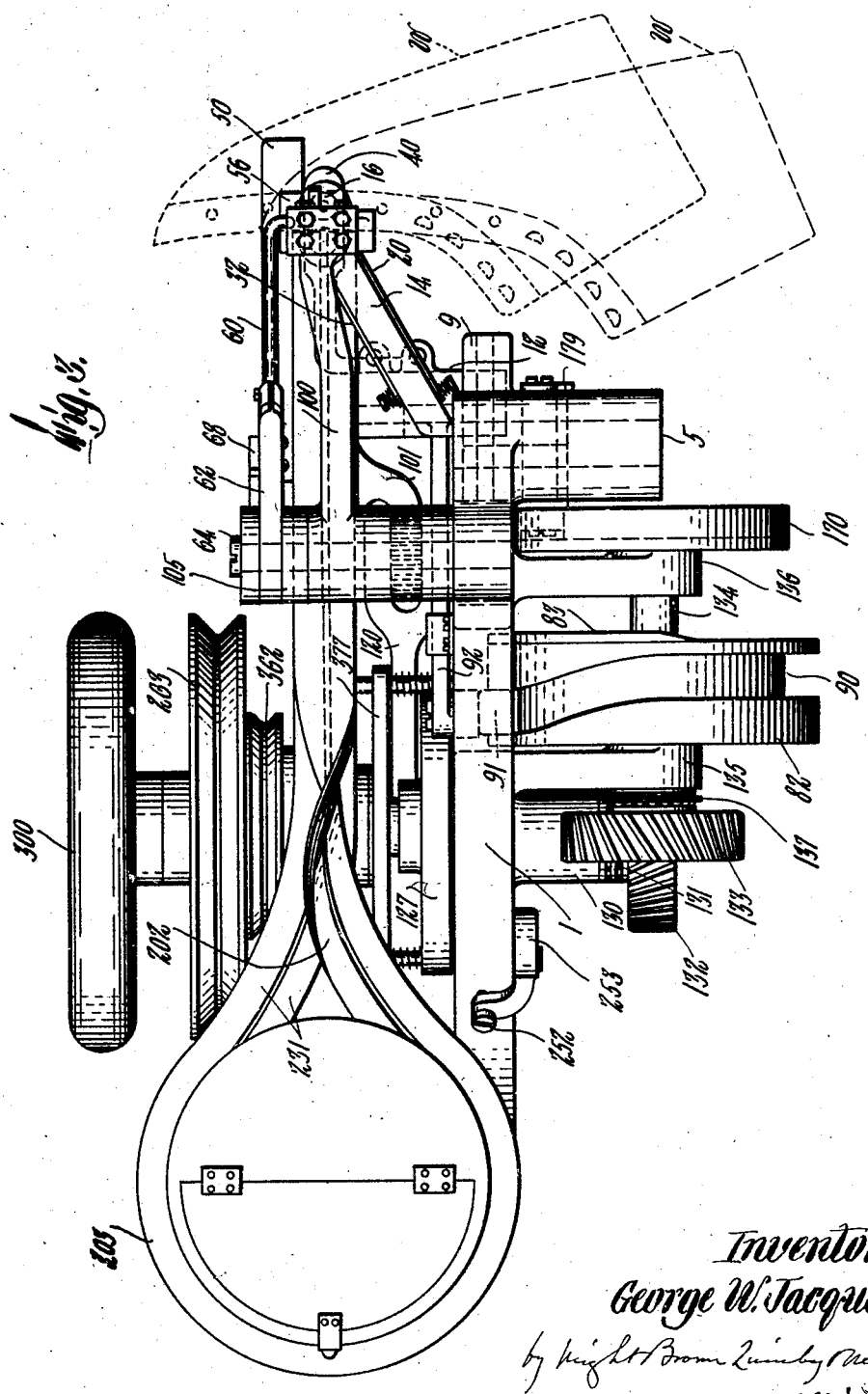

Sept. 29, 1931.　　　　G. W. JACQUES　　　　1,824,957
DUPLEX FASTENER SETTING MACHINE
Filed Feb. 5, 1927　　　7 Sheets-Sheet 4
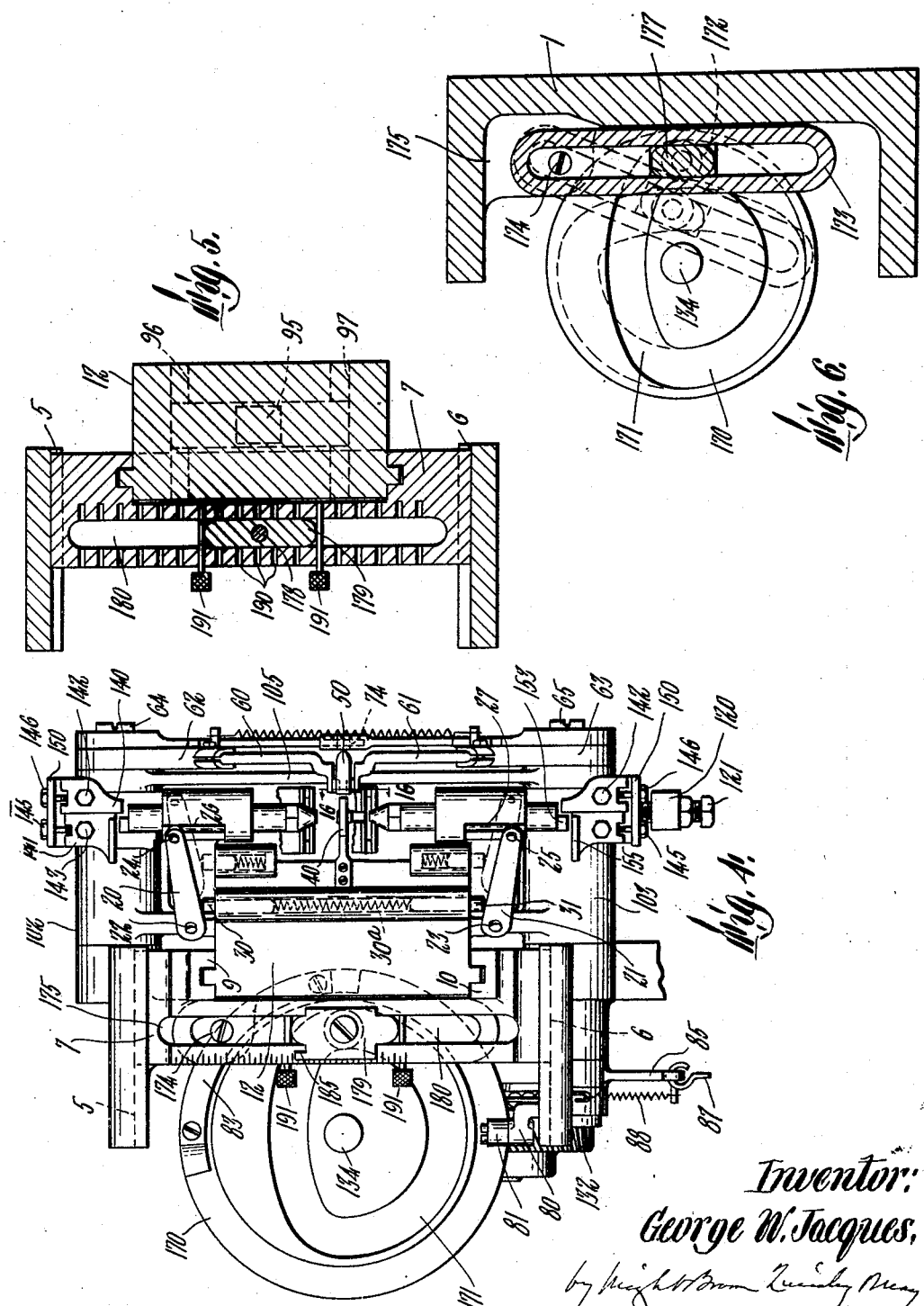
Inventor:
George W. Jacques,
by [signature]
Attys.

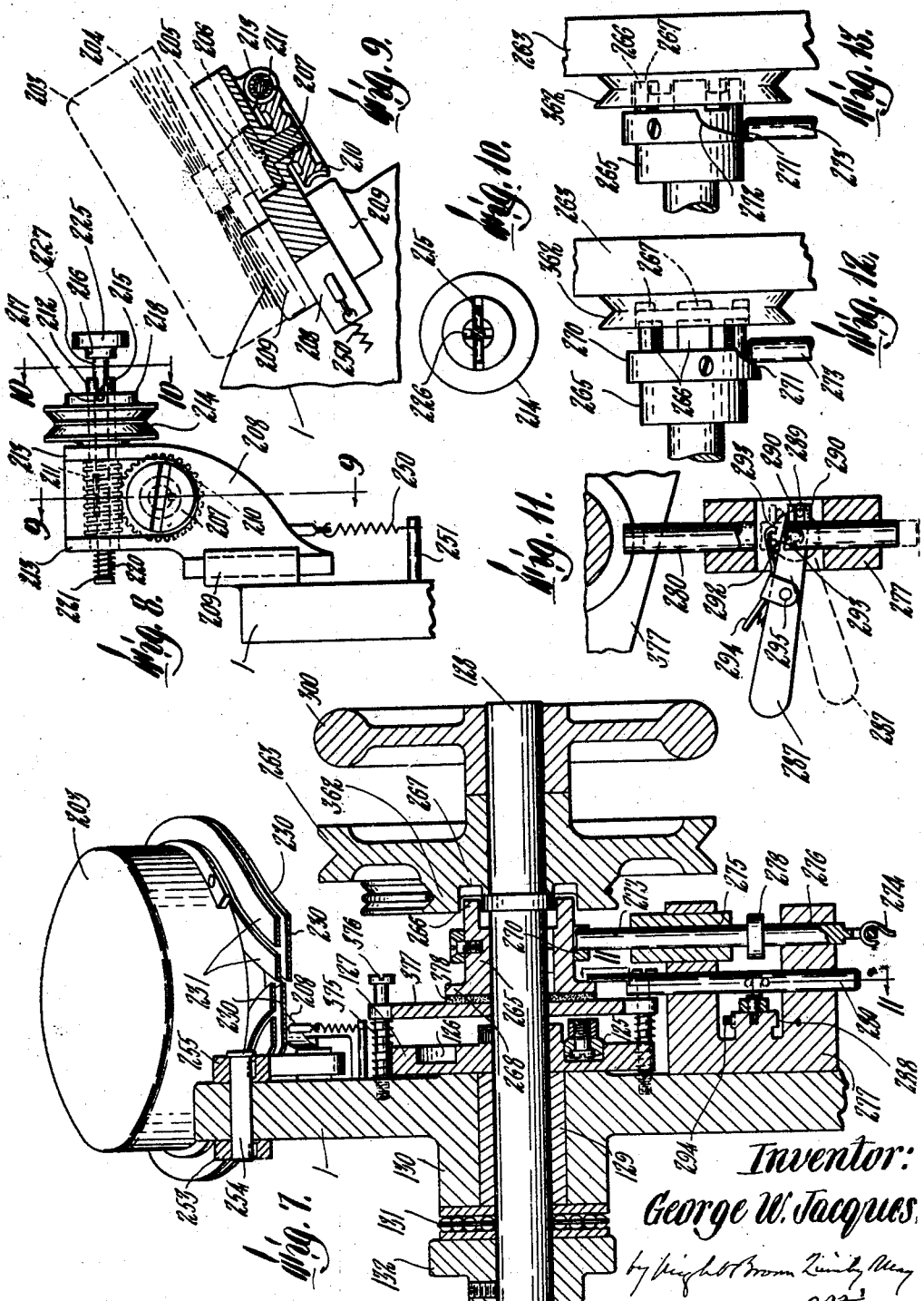

Sept. 29, 1931.    G. W. JACQUES    1,824,957
DUPLEX FASTENER SETTING MACHINE
Filed Feb. 5, 1927    7 Sheets-Sheet 6
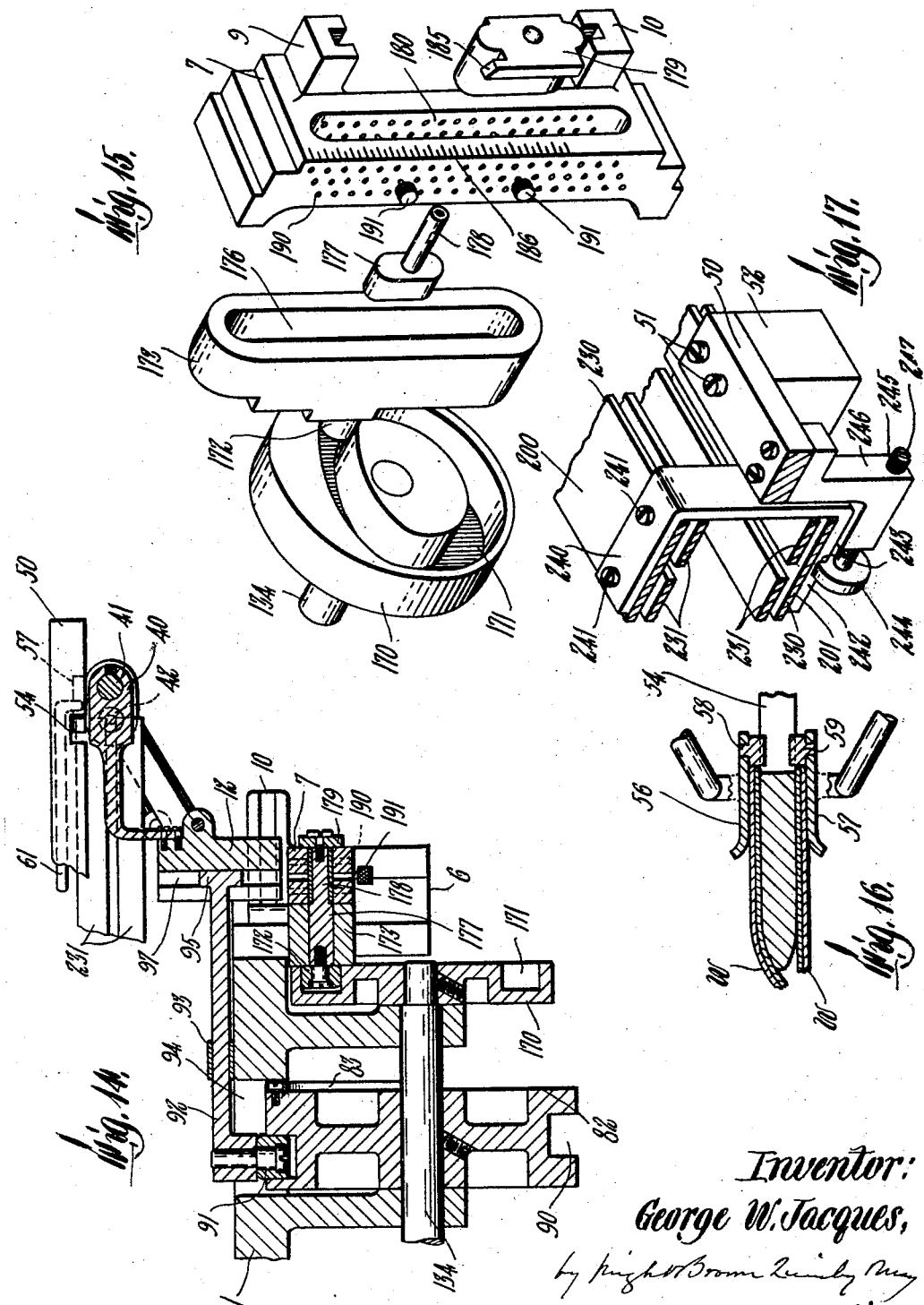
Inventor:
George W. Jacques,
by Knight Brown Quinby May
attys.

Sept. 29, 1931.   G. W. JACQUES   1,824,957
DUPLEX FASTENER SETTING MACHINE
Filed Feb. 5, 1927   7 Sheets-Sheet 7
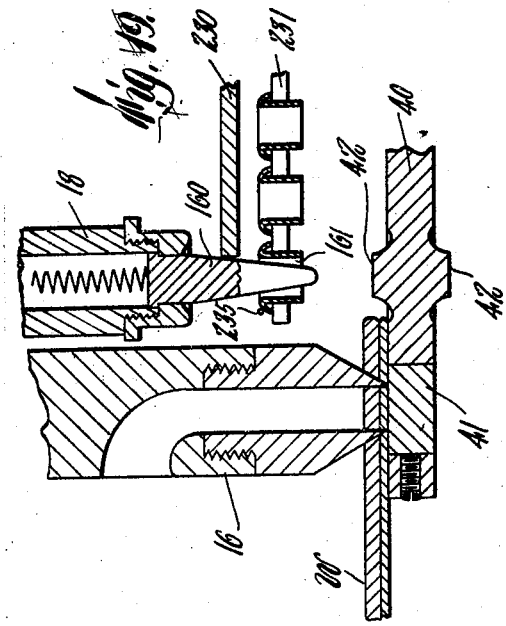
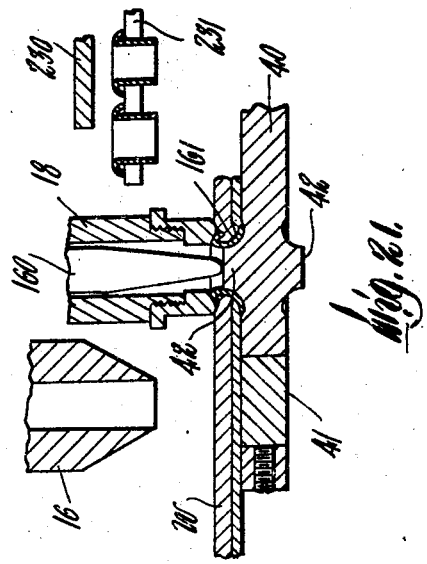
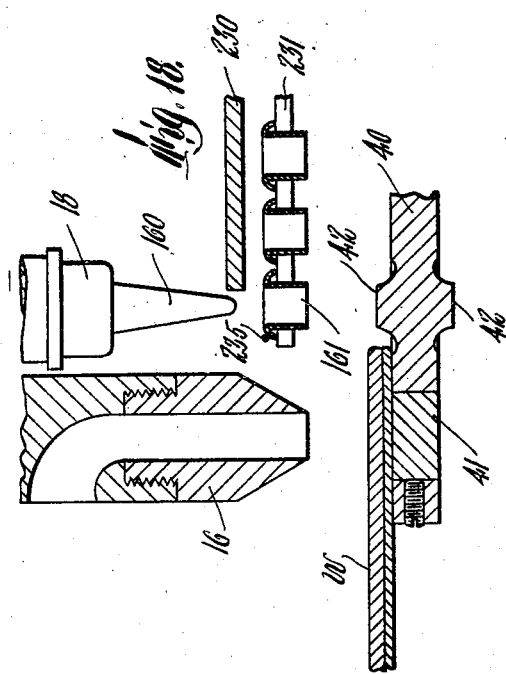
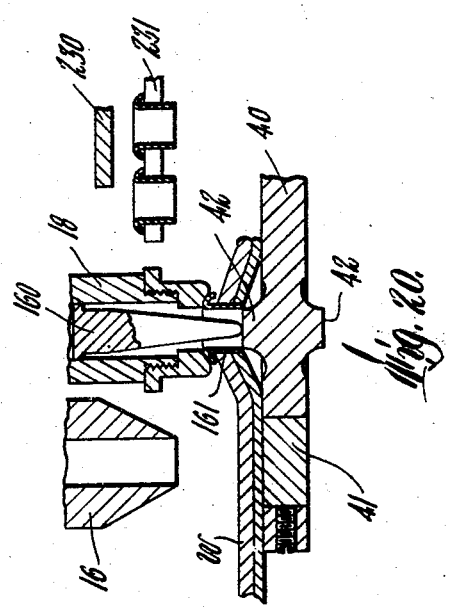
*Inventor:*
*George W. Jacques,*

Patented Sept. 29, 1931

1,824,957

UNITED STATES PATENT OFFICE

GEORGE W. JACQUES, OF NEW BEDFORD, MASSACHUSETTS, ASSIGNOR TO ATLAS TACK CORPORATION, OF FAIRHAVEN, MASSACHUSETTS, A CORPORATION OF NEW YORK

DUPLEX FASTENER SETTING MACHINE

Application filed February 5, 1927. Serial No. 166,153.

This invention relates to machines for setting fasteners, more particularly for setting a pair of fasteners simultaneously in mating pieces of material.

One of the objects of this invention is to provide such a machine more compact than those heretofore made so that more machines may be placed in a given floor space and to provide a machine capable of high speed.

Another object is to provide a construction wherein the work is in full view of the operator during the punching and setting operations and wherein the work may be manipulated during the operation of the machine without interference from machine parts.

A further object is to improve the feed mechanism so as to eliminate the possibility of lost motion which has been troublesome in many machines as heretofore made, resulting in faulty work and injury to machine parts, due to interference with each other.

A still further object is to provide a construction wherein the raceway for delivering the fasteners to the setting devices is operatively stationary, this eliminating noise and complication, and in which the fastener feed mechanism is arranged entirely back of the setting devices out of the way, requiring no fastening device to hold it in operative position, and which may be removed from the machine as a unit by a simple lifting action.

Still another object is to provide an improved presser foot mechanism, the presser feet releasing the work and being separable by the operator to permit ready insertion and removal of the work.

A further object is to improve the clutch and stop mechanisms as applied to such machine so as to make the whole machine more compact, this mechanism being provided with means for retarding the motion of the machine just before it reaches its final stopped position so that it is brought to rest easily and quietly.

While not restricted thereto in its broadest aspects, this invention relates more particularly to the setting of what may be termed "barrel fastenings", that is, fastenings having a tubular portion which is passed through the work and which is then flared out and clinched against the face of the work in the setting operation.

Further objects and advantages will appear from a more complete description of an embodiment of the invention disclosed in the accompanying drawings in which Figures 1 and 2 are right and left end elevations, respectively, of the machine.

Figure 3 is a top plan view.

Figure 4 is an elevation looking in the direction of the arrow a on Figure 1, the machine base being broken away.

Figures 5 and 6 are detail sections on lines 5—5 and 6—6, respectively, of Figure 2.

Figure 7 is a section on line 7—7 of Figure 1.

Figure 8 is a detail plan of the distributing hopper support.

Figures 9 and 10 are detail sections on lines 9—9, and 10—10, respectively, of Figure 8.

Figure 11 is a detail section on line 11—11 of Figure 7.

Figures 12 and 13 are detail elevations of the clutch and stop mechanism in different angular positions.

Figure 14 is a detail section on line 14—14 of Figure 2.

Figure 15 is a perspective of certain portions of the feed mechanism somewhat separated for clearness of disclosure.

Figure 16 is a detail section through the work support and presser feet on line 16—16 of Figure 4.

Figure 17 is a sectional detail in perspective showing a support for the lower forward end of the raceway.

Figures 18 to 21 are details partly in section showing relative positions of the upper punching and setting mechanisms at different portions of the cycle of operations of the machine.

Referring more particularly to Figures 1 to 3 and 9, it will be seen that the working parts of the machine are carried entirely by a single upstanding web frame portion 1 having a supporting foot or base portion 2 which may be fixed to a suitable table or other support. This web portion has a forwardly and downwardly projecting edge in which are formed upper and lower guideways 5 and 6 for the slidable reception of a horizontally movable carriage 7, this carriage moving laterally with reference to the operator, this motion providing for the feed of the work and crosswise of the general plane of the web, as will later appear.

This feed carriage 7, as best shown in Figures 5 and 15, is provided with upper and lower ways 9 and 10 for the reception of a slidable block 12, which moves at right angles to the line of motion of the carriage, or forwardly and backwardly with relation to the operator. This block 12 carries the punching and setting mechanisms by which the work is punched and the fasteners, herein shown as eyelets, are set in the holes in the work made by the punches. For the purpose of carrying the punches and sets, the block 12 is provided with upper and lower forwardly and downwardly projecting arms 14 and 15, these arms having alined tubular openings therein, the forward ones slidably receiving the punches 16 and 17 and the rearward ones the sets 18 and 19, these openings or sockets being one directly back of the other in each of the arms 14 and 15.

The punches are normally held from each other by any suitable means, such means, as herein shown in Figures 2 and 4, comprising levers 20 and 21 pivoted at 22 and 23 to extensions from the block 12, the outer ends of these levers having pins 24 and 25 riding in slots 26 and 27 in the outer portions of the arms 14 and 15 and in engagement with the punches. These levers are pressed away from each other by means of abutments 30 and 31 seated in a suitable socket in the block 12 and pressed from each other by a spring 30a.

The sets are similarly pressed towards retracted position by means of similar levers 32 and 33 pivoted on the opposite sides of the arms 14 and 15 and having pins 34 and 35 riding in slots 36 and 37 in the arms 14 and 15 and engaging the sets 18 and 19, these levers being spring pressed away from each other by individually spring pressed abutments 38 and 39 in suitable sockets on the opposite side of the block 12.

The block 12 also carries, as shown best in Figures 4 and 14, a member 40 which projects between the upper and lower punches and sets and which is provided at its outer end with a removable anvil piece 41 (see also Figures 18 to 21) with which the cutting edges of the punches cooperate on opposite sides. Back of the anvil piece 41 the member 40 is provided on its upper and lower faces with the setting portions 42 with which cooperate the upper and lower sets in setting the eyelets.

It will thus be seen that the punches and sets may be moved forwardly and rearwardly, together with the member 40 therebetween, all these parts constituting punching and setting devices, and, as will later more fully appear, when the eyelets have been set the carriage 7 is moved laterally with the sets in engagement with the set eyelets so as to feed the work.

The work is supported on either side of a stationary work support 50 which is attached, as by means of screws 51, to a block 52 carried by the frame web 1. This member 50 has a forward portion against upper and lower faces of which ride presser feet 56 and 57. As shown best in Figure 16, these presser feet are provided with edge gage blocks 58 and 59 arranged to project into a cut away portion 54 in the member 50, these blocks determining the rearward extent to which the pieces of work shown at W may be inserted in the machine. These presser feet, as shown best in Figure 1, are fixed to rods 60 and 61 adjustably mounted in arms 62 and 63 pivoted on shafts 64 and 65 carried by the frame web 1 back of the upper and lower guideways 5 and 6. The upper shaft 64 is fixed to the frame web 1 while the lower shaft 65 extends therethrough and is journaled therein. On the upper shaft 64 is pivoted a presser foot actuating arm 66 while a similar arm 67 is fixed to the lower shaft 65. Each of these arms 66 and 67 has an extension as 68 and 69 provided with an adjustable abutment screw such as 70 and 71 positioned to impinge on the adjacent arm 62 or 63 to move these arms away from each other when the arms 66 and 67 are rocked, such rocking being done in time with the feed motion of the machine as will later appear. A spring 72 extending between the arms 62 and 63 acts to hold the presser feet in engagement with the work when this is permitted by the angular position of the arms 66 and 67. These arms are connected for simultaneous movement, the arm 66 having a slotted extremity as at 73 engaging a pin 74 in the arm 67.

These arms 66 and 67 derive their presser foot actuating motion by rocking of the shaft 65, and for the purpose of rocking this shaft it has fixed thereto, on the opposite side of the frame web 1 from the arm 67, as shown in Figure 2, a cam arm 80 having a cam follower roll 81 which rests against a face of a cam 82. This cam 82 has an extended face portion 83 which engages the follower 81 as the cam rotates and rocks the arm 80 and shaft 65 to separate the presser feet slightly so as to disengage them from the work when the work is being fed.

For the purpose of separating the presser feet for the insertion or removal of work, the shaft 65 has fulcrumed thereon, as shown in Figures 1 and 2, a lever arm 85 which has a laterally extended pin portion 86 engageable with the under side of the cam arm 80. The opposite end of the lever 85 is provided with a connecting rod 87 leading to a suitable treadle or other operator actuating means, on the depression of which the lever 85 is rocked, raising the cam follower roll 81 from the surface of the cam roll 82, thus rocking the shaft 65 in a direction to separate the presser feet. A spring 88 normally holds the lever arm 85 rocked to such a position that the cam roll 81 is free to rest against the face of the cam 82.

The cam 82 also has another function in the operation of the machine, for which purpose it is provided with an edge groove 90 (see Figure 14) in which rides a cam roll 91 fixed to a slide bar 92 mounted to slide in a guide 93 on the opposite side of the frame web 1 from the cam 82, the frame web having a slot 94 therethrough into which the cam 82 projects. The outer end of the slide bar 92 is formed with a head 95, both laterally and vertically extended, (see also Figure 1) which rides in upper and lower guideways 96 and 97 in the block 12. As the cam 82 rotates, therefore, the slide bar 92 is reciprocated axially, thus to move the block 12 with the punching and setting mechanisms forwardly and rearwardly so as to bring the sets and punches, respectively, into and out of position relative to the work.

The punches and sets are given their motion to and from the work by means of upper and lower hammer arms 100, 101, respectively, each of these having hub portions 102, 103 journaled on the upper and lower shafts 64 and 65. Outwardly of these hub portions these shafts may be provided with outboard bearings in a tie rod member 105 through which the shafts 64 and 65 are journaled, and which is positioned between the outer ends of the hub portions 102 and 103 and the presser foot arms 62 and 63. Integral with the hubs 102 and 103 are shown arms 110, 111 which extend toward each other and are provided with meshing gear segment portions 112, 113, thus to insure simultaneous and opposite rocking of the hammer arms 100 and 101. Rocking of these arms is produced by connections to the arm 101. These connections, as shown, comprise a cam lever 120 journaled on the shaft 65 and engaging at its forward end a yieldable member such as a spring 122 surrounding an adjustable screw 121 passing through the lever 120 and threaded into the arm 101. The rear end of the lever 120 is provided with a cam follower roll 125 (see Figures 1 and 7) running in a groove in a cam 127 carried by a main drive shaft 128 which is journaled in a bushing 129 extending through a hub portion 130 of the frame web 1. This main shaft carries a drive mechanism, as will later appear, and at one end beyond the hub portion 130 and outwardly of the thrust ball bearing 131 it carries a spiral gear 132 meshing with a similar spiral gear 133 carried by a shaft 134 to which is fixed the cam 82. The shaft 134 is journaled in bearings 135 and 136 projecting outwardly from the adjacent face of the frame web 1 and as shown a thrust ball bearing 137 is interposed between the bearing 135 and the gear 133.

Each of the hammer arms 100 and 101 is provided with adjustable punch and set actuating heads 140 and 141. These heads are fixed to the outer ends of the arms 100 and 101 as by means of bolts 142, 143, respectively, and are adjustable substantially vertically by the screws 145 and 146 threaded thereinto and passing through cap plates 150 fixed to the upper and lower faces, respectively, of the arms 100 and 101. Each of the actuating heads 140 has a rounded extremity 152 for engagement with the outer end of the mating punch portion, which, as shown is cut away at its rear edge as at 153 so that the punch may be actuated by the head 140 only when the punch and set mechanisms are in their rearward position, the punches as they are moved forward sliding out from under the corresponding head 140, thus permitting the spring retracting mechanism to move and hold the punches away from the work. Each of the said actuating heads 141, however, has a substantially flat actuating face portion 155 which is extended sufficiently so that the set is actuated whenever the arms 100 and 101 are rocked toward each other, both in the rearward and forward positions of the punch and set mechanism. Each set has its hammer engaging extremity partly cut away as at 153 to clear the corresponding head 140.

Thus in the actuation of the machine, assuming work is positioned between the presser feet and on opposite sides of the work table 50 and the member 40, as the hammer arms 100 and 101 are brought toward each other by the action of the cam 127, the punch is first brought down against the work, as is shown in connection with the upper punch mechanism in Figure 19, thus to punch a hole therein, while an eyelet threading spindle 160 on the set mechanism threads through an eyelet 161 at the lower end of a feeding raceway. The hammers 100 and 101 have been retracted sufficiently to remove the punch from the work but insufficiently to disengage the threading spindle 160 from the eyelet, the cam 82 then acts through the slide bar 92 to move the punches and sets forwardly beneath the actuating heads of the arms 100 and 101, moving the eyelets on the set spindles to the position formerly occupied by the punches and in line with the holes punched in the work, the punches meantime riding out from under their actuating heads and being free from actuation, and the arms 100 and 101 are brought together to press the eyelets into the holes cut in the work, as shown in Figure 20, and then to set them therein, as shown in Figure 21. While in this setting position the presser feet are raised from the work, as hereinbefore described, and the carriage 7 is fed laterally to feed the work. At the end of the feed motion the arms 100 and 101 are separated, thus permitting their retracting spring mechanisms to free the sets from the work, the presser feet having been permitted to again engage the work, and the punch and set mechanisms are moved rearwardly and the feed carriage is moved back to bring the parts into starting position with the punches and sets in their retracted positions and adjacent to the work table 50, as shown in Figures 14 and 18. The yielding connection between the hammers and the actuating lever 120 afforded by the spring 122 acts as a safety device should the punch or sets or both be so adjusted to give excessive pressure.

The feed and retracting motion of the carriage 7 is derived from a cam 170 fixed to the shaft 134 forwardly of the bearing 136. As shown best in Figures 4, 6 and 15, this cam 170 has a cam groove 171 cut in its forward face within which rides a follower 172 extending rearwardly from a lever arm 173. This lever arm is pivoted at 174 near its upper end to a web portion 175 extending laterally from the frame web 1 and is provided with a longitudinally extending slot 176 therein extending substantially its full length and upwardly beyond the fulcrum 174. Within this slot 176 rides a block 177 which may be adjustable lengthwise therein. This block carries a forwardly extending pivot portion 178 journaled in a block 179 slidable in a slot 180 in the carriage 7. By adjustment of the blocks 177 and 179 in the slots 176 and 180, the amplitude of motion imparted to the feed carriage 7 by rocking of the lever 173 may be adjusted. If the pivot 178 and the block 177 is arranged in axial alinement with the fulcrum 174, no motion whatever will be imparted to the feed slide 7, the lower end of the lever 173 then rocking idly, while if the block 177 is adjusted away from alinement with this fulcrum point, motion of the feed slide 7 will be produced, its amplitude of motion being greater the further the block 177 is adjusted away from alinement with the fulcrum 174. In order that the extent of such motion may be readily adjusted and fixed as desired, the block 179 is shown as provided with an indicator rider 185 which, when the block is in position in the block 180, cooperates with a scale 186 marked on the forward face of the carriage. The carriage may be provided with a series of perforations, as at 190, in its walls on either side of the slot 180, through which stop pins 191 may be positioned as desired to confine the block 179 in any desired position or amplitude of adjustment. As shown these perforations are arranged in a plurality of vertical series staggered from each other whereby close adjustment by definite small increments may be produced.

The eyelets are fed in position to be taken by the spindles of the sets by upper and lower raceways 200 and 201. These raceways extend rearwardly substantially straight for a considerable distance directly back from the set mechanisms where they are entirely out of the way of the operator. One of these raceways, herein shown as the upper, is given a half twist, as shown at 202 in Figure 3, so as to reverse the eyelets therein, and leads from one side of the distributing hopper 203, the lower eyelet raceway extending from the opposite side.

The hopper 203 has any suitable agitating means 204 therein, as for example the usual series of rotary brushes mounted on an axially arranged shaft therein. As shown in Figure 9 this shaft is provided at its lower end with an actuating clutch head 205 having a diametrically extending fin 206 projecting therefrom. This fin is intended to be brought into cooperative relation with a driving head member 207 journaled in a block 208 slidably guided in ways 209 extending from the frame web 1 at the rear portion of the machine. This block 208 carries mechanism for rotating the driving head 207, as shown this comprising a worm wheel 210 fixed to the head 207 with which cooperates a worm 211 having a hollow shaft 212 journaled in spaced bearing portions 213 in the block 208. Journaled on the shaft 212 is a grooved drive pulley 214 which may be clutched to the shaft 212. The clutch mechanism for this purpose comprises a rod 227 extending axially through the shaft 212, this rod having a laterally extending pin 215 which may ride in a slot 216 in the shaft 212 and engage in a slot 217 in the outer face of a hub portion 218 on the guide pulley. This pin 215 is normally held in this position by means of a spring 220 reacting between a head 221 on the opposite end of the rod 214 and the adjacent face of the block 208, but it may be removed from this position by a pull exerted on a head 225 of the rod 227, which may be grasped by the operator, and it may then be turned a quarter turn to bring the pin 217 out of alinement with the slot 218, and into a retaining groove 226 on the adjacent end of the shaft 212 and out of engagement with the pulley 214, thereby stopping the rotary action of the brushes and the useless agitation of the eyelets within the hopper during such time as the machine might remain inoperative without the belt being removed. The hopper 203 rests by its weight with the drive element 205 thereon in engagement with the head 207 and may be removed or replaced while the head 207 is rotating.

Each of the raceways leading from the hopper comprises a comparatively wide strip 230 against which the flanges of the eyelets may bear and in parallel spaced relation therewith a pair of strips 231 spaced apart to permit the barrels of the eyelets to extend therebetween. Beneath the twist in the upper raceway the strip 230 is positioned uppermost, the strips 231 being therebeneath, and in the lower raceway the strip 230 is lowermost and the strips 231 are thereabove, the two sets of eyelets being thus presented in reverse position to the sets with their flanged ends facing the movable set mechanisms 18 and 19. At their lower ends the strips 231 are prolonged somewhat below the strips 230 so as to permit clearance of the set spindles from the strips 230 and so that the lowest eyelet of each raceway may be in position to permit the spindles to thread therethrough. The eyelets are prevented from dropping off the lower ends of the raceways by any suitable means, such for example, as spring wires, one being shown at 235, extending into the eyelet path. The raceways are held together in proper spaced relation somewhat above their lower ends as by means of a U shaped strip 240 (see Figures 1 and 17) which is fixed to the upper and lower strips 230 as by means of screws 241.

The raceways may be adjusted laterally as a unit to bring their lower ends into proper position laterally relative to the set mechanisms, and for this purpose the lower arm 242 of the strip 240 is shown in Figure 17 as provided with a slot 243 engageable over the head 244 of an adjusting screw 245 threaded through a Z shaped bracket 246 fixed to the under face of the work table 50 somewhat forwardly of its attachment to the block 52. The screw 245 is provided with a slot 247 in its outer end by which it may be turned so as to adjust the head 244 laterally and with it the raceways. The raceways are thus supported by gravity and may be removed together with the hopper as a unit by a mere lifting operation. They are adjusted as a unit forwardly and rearwardly, the means shown for this purpose being a spring 250 (see Figure 8) engaged between the block 208 which supports the hopper and a pin 251 extending from the frame web 1, this spring acting as biasing means to draw the block 208 as far forwardly as may be permitted by engagement of an abutment screw 252 (see Figures 1, 2 and 3) on the outer edge of the frame web 1, this abutment screw being carried by a hand lever 253 fulcrumed at 254 on the frame web 1 and having its lower end, as at 255, engaged by the forward end of the block 208. By grasping and moving the lever 253 forwardly, the block 208 and the hopper and raceway are moved rearwardly. The hopper and raceways may be removed as a unit by simply lifting them, initial rearward movement being useful to retract them from the set mechanisms so that there is no danger of striking them with the lower ends of the raceways though such rearward movement is not necessary for removal.

With this construction it will be seen that the raceways are positioned entirely back of the punch mechanisms and the points where the fasteners are set in the work where they can not by any chance be in the way of the operator or interfere with the manipulation of the work and that in the normal operation they are stationary, thus eliminating complications and noise and that the eyelets are fed forwardly in the general direction of length of the raceways from the raceways to their positions set in the work.

The agitating mechanism in the supply hopper may be driven from the pulley 214 and for this purpose a belt 260 passed therearound may pass about guide pulleys 261 journaled in a lever 262 extending rearwardly of the frame web 1 and then about a groove pulley portion 362 formed as a part of the main drive pulley 263. The position of the idler pulleys 261 is such as to permit forward and rearward motion of the block 208 without effecting this drive and the lever 262 is pulled downwardly by a spring 363 reacting between it and a fixed pin 364 so as to hold the belt under suitable tension.

The main drive pulley 263 is shown as journaled on the drive shaft 128 with which it may be clutched through a clutch collar 265 fixed to rotate with but slidable axially on the shaft 128. This collar 265 is provided with clutch teeth 266 which may be brought into or out of cooperative relation to mating clutch teeth 267 in an annular recess in the inner face of the drive pulley. This collar 265 is shown as having fixed thereto a cam element 270 having a tapered cam surface 271 (see Figure 13) merging with an abrupt stop face 272. Cooperating with this cam 270 is a control rod 273 which may be depressed out of contact with the cam face by means of a connection 274 (see Figure 7) to a treadle or other suitable actuating member. This control rod 273 is shown as slidable in a pair of spaced guide portions 275, 276 in a U shaped bracket member 277 fixed to the frame web 1, a collar 278 on this control rod limiting both the upward and downward movements thereof. This control rod is normally held in its elevated position by any suitable means and then holds the collar out of clutching position. When the clutch collar 265 is in clutching relation with the drive pulley and the control rod is allowed to rise, the cam face 271 contacts with the upper end of the control rod in the position shown in Figure 13, whereupon continued rotation of the clutch collar causes it to be moved axially to bring the clutch faces out of contact and then the stop shoulder 272 comes up against the control rod so that further rotation of the clutch collar with the shaft 128 is positively stopped. This axial motion of the clutch collar is produced against the pressure of springs 375 which surround screws 376 on which is slidably carried a braking plate 377. Interposed between the braking plate and the clutch collar 265, preferably made fast to one of these elements, is a layer of friction material such as leather, at 378. Movement of the clutch collar in a direction to disengage the clutch faces is therefore opposed by the action of the springs 375 which act, when the clutch collar is moved toward unclutching position, to effect braking pressure between the clutch collar and the plate 377, this tending to stop the rotation of the shaft 128 before it is positively stopped by the impingement of the shoulder 272 on the control rod. When the control rod is depressed the springs 375 act immediately to press the clutch collar toward clutching engagement which becomes effective as soon as the collar clutch faces come into suitable cooperating angular relation with the pulley clutch faces, whereupon the clutch collar moves into full clutching position and the shaft 128 is driven.

It sometimes happens, however, that it is desired to turn over the shaft 128 by hand, and while the drive pulley 263 is being driven by power. For this reason means may be provided for holding back the clutch collar from moving to clutching position on depression of the control rod. This means, as shown, comprises a rod 280 vertically slidable in spaced openings in the bracket 277 so that its upper end may be brought into the path of movement of a flange 268 on the clutch collar 265, thus to prevent the clutch collar from being moved into clutching position. Means for moving this rod 280 into and out of such position, as shown, comprises a hand lever 287 pivoted on a boss 288 extending between the bearing portions of the bracket 277, this lever 287 having a laterally extending pin 289 extending between a pair of spaced pins 290 projecting from the rod 280. The boss 288 is provided with a curved outer face portion 292 provided with a pair of sockets 293 therein into either selected one of which one end of a spring pressed dog 294 pivoted at 295 to the lever 287 may be engaged. When engaged in one of these, as shown in full lines in Figure 11, the upper end of the rod 280 is beneath the edge of the flange 268, so that it does not interfere with its motion, while when the hand lever is rocked downwardly to the dotted line position, the dog catching in the other socket 293, the rod is raised into dotted line position in the path of motion of the flange 268. When it is in its upper position, depression of the control rod 274 will release the clutch collar for rotary motion, but as it will not be thrown into clutching relation with the drive pulley 263, being held back by the rod 280, the drive shaft 128 is free to be turned as by means of a hand wheel 300 fixed to the outer end of the shaft 128.

From an inspection of Figure 3 it will be seen that the station at which the holes are punched in the work and the eyelets are set therein, is well forward in the machine, there being no machine parts to interfere with the manipulation of the work. By reason of the fact that the punches are further forward than the sets, the work is placed in the machine to a minimum distance for the punches to act, and as in the setting operation the punches are out of alinement with their actuating hammer heads and are thus in retracted position, they do not interfere with the manipulation of the work or to any considerable amount with the visibility of the upper piece of work at the points where the eyelets are being set.

In dotted and dash lines on this figure is shown successive positions of a shoe upper being fed through the machine and eyelets set therein, this figure illustrating the freedom with which the work may be handled and the lack of interferences of operating mechanisms to its manipulation.

Having thus described an embodiment of this invention it should be evident to those skilled in the art that various changes and modifications might be made therein without departing from its spirit or scope as defined by the appended claims.

I claim:

1. In a machine of the class described, punching and setting devices including a member having punching and setting portions disposed on each of opposite sides thereof, and a punch and a set movable to and from said member on each of said opposite sides and cooperating with said portions, means for moving said devices as a unit to successively present said setting and punching portions in the same relation to work, and a pair of raceways alined with the direction of movement of said devices and laterally of the line of feed of the work for delivering fasteners to both of said sets.

2. In a machine of the class described, a stationary work support, punching and fastener setting devices including a member having punching and setting portions, means for actuating said devices to punch holes in the work and set fasteners therein, said actuating means including mechanism for moving said member forwardly while adjacent to said support to present said portions in succession in the same position relative to the work, means for delivering fasteners forwardly to said devices in line with the forward movement of said member, and means acting while said devices are in engagement with a fastener set in the work to move said devices laterally away from said support to feed the work.

3. In a machine of the class described, a stationary work support, means for holding work against opposite sides of said support, fastener setting devices including a member having punching and setting portions on each of opposite faces and a punch and a set movable toward and from said member on opposite sides and cooperating with said punching and setting portions, means for actuating said devices to punch holes in the work and to set fasteners therein, said actuating means including mechanism for moving said member forwardly while adjacent to said support to present said portions in succession in the same position relative to work held to said support, means for delivering fasteners forwardly to said devices in line with the forward movement of said member, and means acting while said devices are in engagement with a fastener set in each piece of work to move said devices laterally away from said support to feed the work.

4. In combination, a frame comprising a base and a single web upstanding from said base, a drive shaft carried by and crosswise of the general plane of said web, and devices actuated by said shaft and carried entirely by said web for setting fasteners.

5. In combination, a frame comprising a base and a single web upstanding from said base, a drive shaft journaled transversely of said web, a shaft extending along a face of said web and driven from said drive shaft, and fastener setting devices actuable by said shafts to set fasteners and to feed the work.

6. In combination, a frame comprising a base and a single web upstanding from said base, a drive shaft journaled transversely of said web, a shaft extending along a face of said web and driven from said drive shaft, a carriage movably supported from said web, fastener setting devices on said carriage, and mechanism actuated by said shafts for operating said devices to set fasteners and for moving said carriage to feed the work.

7. In combination, a frame comprising a base and a single web member upstanding from said base, barrel fastener setting and work feeding devices carried by said member, and means carried entirely by said member for actuating said devices to set fasteners and to feed the work crosswise of the general plane of said web member.

8. In combination, a frame comprising a base and a single web member upstanding from said base, means carried by said member for simultaneously setting separate fasteners in a plurality of pieces of work and for feeding the work crosswise of the general plane of said web member, and means carried entirely by said member for actuating said setting and work feeding means.

9. In combination, a frame comprising a base and a single web upstanding from said base, a slideway formed transversely of said web, a carriage movable in said slideway, fastener setting devices carried by said carriage, and mechanism carried entirely by said web for actuating said devices and for moving said carriage to feed the work, said mechanism including a drive shaft extending transversely of said web.

10. In combination, a frame, a drive shaft journaled in said frame, a shaft arranged at an angle to said drive shaft and driven therefrom, and barrel fastener setting devices actuable by said shafts to set fasteners, and means actuated by said driven shaft to feed the work.

11. In a machine of the class described, a frame, a traversing carriage mounted in said frame, punching and setting devices including mechanism mounted on said carriage for movements substantially perpendicular to the line of traverse of said carriage and including a punch and a set and a member having cooperating punching and setting portions, means for traversing said carriage including a pivoted link having a cam follower thereon, and a connection between said link and carriage adjustable to and from the fulcrum of said link, an element slidably connected to said mechanism for moving said mechanism relatively to said carriage, a cam follower on said element, and cams for actuating said followers.

12. In a machine of the class described, a frame, a traversing carriage mounted in said frame, punching and setting devices including mechanism mounted on said carriage for movements substantially perpendicular to the line of traverse of said carriage and including a punch and a set and a member having cooperating punching and setting portions, means for traversing said carriage including a pivoted link having a cam follower thereon, and a connection between said link and carriage adjustable to and from the fulcrum of said link, an element slidably connected to said mechanism for moving said mechanism relatively to said carriage, a cam follower on said element, a shaft, and cams on said shaft for actuating said followers.

13. In combination, a frame comprising a base and a single upstanding web, a drive shaft journaled through said web, said web having a laterally extending slideway, a shaft driven from said drive shaft and journaled on one side of said web, a carriage movable in said slideway, a block slidable laterally of said carriage, punching and setting devices carried by said block and movable on the sliding of said block alternately into operative position, mechanism for actuating said devices, a cam on said drive shaft for actuating said mechanism, and cams on said driven shaft for sliding said block and for moving said carriage to feed the work.

14. In combination, a frame comprising a base and a single upstanding web, a drive shaft journaled through said web, said web having a laterally extending slideway, a shaft driven from said drive shaft and journaled on one side of said web, a carriage movable in said slideway, a block slidable laterally of said carriage, punching and setting devices carried by said block and movable on the sliding of said block alternately into operative position, mechanism for actuating said devices, a cam on said drive shaft for actuating said mechanism, cams on said driven shaft for sliding said block and for moving said carriage to feed the work, and means carried by said web for feeding fasteners to said devices.

15. In a machine of the class described, punching and setting devices comprising a member having a rearward setting portion and a forward punching portion, means for feeding fasteners to said devices including a raceway extending rearwardly from said member in substantial alinement with said portions, means for adjusting the forward end of said raceway laterally of said member, and means for adjusting said raceway longitudinally toward and from said member.

16. In a machine of the class described, punching and setting devices comprising a member having a rearward setting portion and a forward punching portion, means for feeding fasteners to said devices including a raceway extending rearwardly from said member in substantial alinement with said portions, means for adjusting the forward end of said raceway laterally of said member, means for adjusting said raceway longitudinally toward and from said member, and means for actuating said devices to simultaneously punch the work and to thread a fastener and then to move said setting device and fastener from said raceway and present said fastener to the hole punched and to set the fastener therein.

17. In a machine of the class described, upper and lower fastener setting devices, a fastener supply hopper, upper and lower raceways extending from said hopper forwardly of the machine toward said devices, means for holding the forward ends of said raceways in superposed relation to deliver fasteners in the general direction of the lengths of said raceways, a headed screw extending laterally of said raceways, said holding means engaging the head of said screw to adjust the ends of said raceways simultaneously laterally by rotation of said screw, and means for adjusting said raceways longitudinally.

18. In a machine of the class described, a frame, fastener setting devices carried by said frame, a fastener supply mechanism comprising a supply hopper and a raceway extending from said hopper, and means on said frame for supporting said supply mechanism in operatively stationary position by gravity only and with the delivery end of said raceway in cooperative relation to said devices.

19. In a machine of the class described, a frame, fastener setting devices carried by said frame, a block slidable toward and from said devices and biased toward a forward position, a fastener supply hopper supported on said block, a raceway leading from said hopper toward said devices, and means for adjustably limiting the forward movement of said block to adjust the delivery end of said raceway relative to said devices.

20. In a machine of the class described, a frame, a pair of oppositely disposed hammers pivoted to said frame, connections between said hammers for simultaneous movement toward and from each other, a carriage laterally movable on said frame, a pair of oppositely disposed punches and sets carried by said carriage and movable with the movement of said carriage between said hammers, a member between said punches and sets having portions on opposite faces cooperating therewith, means for moving said punches, sets and member forwardly and rearwardly to present said punches and sets alternately in the same position, said punches being out of cooperative relation to said hammers when in the forward positions, means for delivering fasteners to said sets in their rearward positions, means for actuating said hammers to cause said punches to punch oppositely disposed pieces of work positioned on opposite sides of said member, to take fasteners from said supply means and set them in the holes punched, and for then moving said carriage to feed the work with the fasteners set therein.

In testimony whereof I have affixed my signature.

GEORGE W. JACQUES.